Patented Nov. 6, 1951

2,573,956

UNITED STATES PATENT OFFICE 2,573,956

PROCESS FOR TREATING NONFIBROUS CELLULOSIC FILM AND RESULTING PRODUCT

John Harold Daniel, Jr., Cos Cob, and Chester Grey Landes, New Canaan, Conn., and John Davis Pollard, Baltimore, Md., assignors to American Cyanamid Company, New York, N. Y., a corporation of Maine No Drawing. Application June 28, 1949, Serial No. 101,915

19 Claims. (Cl. 117—76)

This invention relates to a process for treating non-fibrous regenerated cellulosic film in order to improve the anchoring of said film to the subsequently applied topcoat. This invention further relates to a process for treating non-fibrous regenerated cellulosic film with a polyamine-halohydrin resin in order to improve the anchoring of said film to the subsequently applied topcoat. More particularly, this invention relates to a process for treating a non-fibrous cellulosic film with an alkylene polyamine or a polyalkylene polyamine-halohydrin resin in order to improve the bonding of the cellulosic film to the subsequently applied topcoat.

One of the objects of this invention is to treat regenerated cellulosic films with an aqueous dispersion of a polyalkylene-polyamine-halohydrin resin so that the subsequent application of the topcoat to the film will be securely bonded thereto, particularly when exposed to moist or humid conditions. Another object of this invention is to improve the bonding of the topcoat to the cellulosic film by the practice of the process of this invention. A further object of this invention is to impregnate non-fibrous cellulosic film with an aqueous resinous dispersion of low concentration in order to improve the bonding of the film to the subsequently applied topcoat, thereby effecting such anchorage with a minimum cost. A further object of this invention is to treat regenerated cellulose with an aqueous dispersion of a resin under alkaline conditions, in order to improve the bonding of the topcoat to the cellulose. A further object of the present invention is to accomplish an improvement in the economy of the operation of anchoring the topcoat to the cellulose base. A still further object of the present invention is to produce non-fibrous regenerated cellulosic films which have a topcoat so completely bonded to the film by the use of this anchoring agent that a greater application of the films can be accomplished. Other objects of this invention will be shown hereinbelow.

This novel process, and improved products produced thereby, extends the use of these films in the packaging of foods, particularly those which are either in a moist or frozen state.

In order to explain more fully the process of this invention, it is desired to illustrate the invention with a few selected examples. It should be remembered, however, that specific enumeration of detail is to be taken by way of illustration only, and is not to be considered as a limitation on the case, except as indicated by the appended claims. All parts are parts by weight.

Example 1

A 3% aqueous solution of a tetraethylene pentamine-epichlorohydrin resin mol ratio (1:3) is prepared with 8% by weight of glycerol. A sample of wet, reswollen non-fibrous cellulosic film is immersed in this resin solution for about a 5 minute period, the film is removed from the aqueous dispersion, and dried for about 10 minutes at 200° F. This drying step results in a partial curing of the applied resin. The topcoat, which consists of a nitrocellulose base topcoat, is then applied and the film immersed in water for testing purposes. After a 10 day period, during which the coated film had been immersed in water, the topcoat is still securely anchored to the cellulose film base.

Example 2

An aqueous dispersion of diethylene triamine-dichlorohydrin resin (mol ratio, 1:2) is prepared by dispersing 0.1% of the resin in water. The percentage of the resin used is based on the total weight of the solution. To the solution is added 8% of diethylene glycol. A non-fibrous cellulosic film is immersed in the bath for about 5 minutes, whereupon it is removed and dried, and the topcoat applied. The film is then immersed in water for an extended period of time for testing purposes. After a 10-day period, there is no sloughing of the topcoat from the film base. It is to be noted, then, that the adhesion of the topcoat to the cellulosic film base produces results that are unexpected and unusual.

Example 3

An aqueous resin solution is prepared by dispersing 0.3% of triethylene tetramine-epibromohydrin resin (mol ratio, 1:2.5) in water. The percentage of the resin in the aqueous dispersion is based on the total weight of the dispersion. To this aqueous dispersion is added about 8% by weight of glycerin. The regenerated cellulose films are then immersed in the aqueous resin dispersion and allowed to remain for about 5 minutes, after which they are removed from solution, dried for about 10 minutes at 200° F., which permits the resin to become partially cured, and the films are then coated with a topcoating material. The films are then immersed in water for a coating adhesion test. After a 10-day period, the topcoat is still securely anchored to the film base. This definitely indicates that good adhesion of the topcoat to the film is obtained by the use of this anchoring agent.

Example 4

An aqueous resin solution comprising 0.6 by weight of tetraethylene pentamine-epichlorohydrin resin (mol ratio, 1:3) based on the total weight of the solution, is prepared. To this solution is added about 8% by weight of glycerol, based on the total weight of the solution. A non-fibrous cellulose film is immersed in the solution for a 5-minute period, then removed and dried for 10 minutes at a temperature of about 200° F. This enables the resin to become partially cured. The film is then coated with a topcoat and immersed in water for a coating adhesion test. In 10 days, the topcoat is still firmly anchored to the cellulose base.

Example 5

An aqueous resin dispersion of the tetraethylene pentamine-epichlorohydrin cationic resin (mol ratio 1:3) containing 1.5% resin by weight based on the total weight of the solution is prepared. A non-fibrous cellulosic film is immersed in the solution for about 5 minutes, removed and dried for 10 minutes at 200° F. The film is then coated with a top-coat and subjected to the coating adhesion test. After the film had been immersed in water for 10 days, the topcoat had not sloughed but was still firmly anchored to the film base.

In the practice of the process of this invention it is possible to vary the actual treatment in many different ways. For instance, one may immerse the non-fibrous regenerated cellulosic film in the aqueous dispersion of the resin, remove it from this dispersion and subject it to a plasticizing bath, prior to the drying and partial curing of the resin. Or, one may incorporate the plasticizing agent into the aqueous dispersion of the resin, so that the treatment of the film may be consummated in one operation. A further modification of the general process may be accomplished by passing the film through a coagulating bath, washing it, and then immersing the film in the resin solution, drying the film, then washing the film, and subsequently immersing it into a plasticizing bath, finally drying and applying the topcoat. A still further modification of the process may be accomplished by immersing the film in the aqueous resin dispersion, removing the film, drying and applying the topcoat. When the process is practiced without the plasticizing agent, good bonding results, but it is preferred to make use of a plasticizing agent. Each of these modifications of the process itself and others obvious to one skilled in the art is within the intended scope of the invention.

As plasticizing agents, one may make use of such compounds as polyhydric alcohols, the ureas, and the like, in aqueous solution.

The use of polyhydric alcohols in solution as plasticizing agents need not be limited to those alcohols that have more than two hydroxy groups, but includes the dihydric alcohols as well. Amongst the polyhydric alcohols which may be used are ethylene glycol, diethylene glycol, glycerol, trimethylene glycol, tetramethylene glycol, pentamethylene glycol, and the like.

The use of the polyalkylene polyamine-halohydrin resins or alkylene polyamine-halohydrin resins as bonding agents for the impregnation of non-fibrous cellulose film can best be accomplished by the use of a plasticizing agent in the softening or plasticizing bath. It is preferred that the plasticizing bath be an aqueous solution of a soluble polyhydric alcohol of relatively low concentration, e. g. 8%. By increasing the concentration of the polyhydric alcohol in the softening bath resin-containing solution, no appreciable difference in result is to be observed, even when the concentration of the polyhydric alcohol is increased to double that previously indicated. Sixteen percent (16%) solutions of the polyhydric alcohol, together with 0.5% of the polyalkylene polyamine-halohydrin resin, produce no appreciable difference over a comparable solution which contains only 8% of the polyhydric alcohol. However, the minimum percentage of the polyhydric alcohol in the softening baths should be not appreciably less than about 2% for best results.

The practice of the process of this invention can be extended, so as to include the treatment of a variety of non-fibrous cellulosic films. It may be applied to films of regenerated cellulose films prepared from solutions of cellulose xanthates, cuproammonium cellulose, cellulose nitrate, cellulose acetate, and the like.

Amongst those water-repellent topcoats which could be used in the final treatment of the cellulose films, are those coating compositions containing as the film-forming constituent, compounds such as nitrocellulose, cellulose acetate, methyl cellulose, deacetylated chitin, rubber, chlorinated rubber, rubber hydrochloride, ethyl cellulose, butyl methacrylate, chlorinated rubber, moisture-resisting lacquers, waxes such as montan wax, beeswax, carnauba wax, and other conventional film-forming coating materials.

Amongst the alkylene polyamines which can be used in the preparation of these resins are 1,2-diamino ethane, 1,3-diamino propane, 1,4-diamino-n-butane, 1,5-diamino-n-pentane, 1,6-diamino-n-hexane, 1,10-diamino-n-decane, 1,6-diamino-3-methyl-n-hexane, and the like. Amongst the polyalkylene polyamines which may be used in the preparation of the resin with the difunctional halohydrins, are diethylene triamine, triethylene tetramine, tetraethylene pentamine, polypropylene polyamines such as di-3-amino-propylamine, pentaethylene hexamine, and the like.

The difunctional halohydrins which are used in the preparation of these resins are the derivatives of glycerol, in which at least one hydroxy group, preferably a terminal hydroxy group, has been substituted by a halogen atom, such as by the substitution of chlorine, iodine, bromine, and the like.

In the instance of a monohalo-substitution, it is necessary that the remaining two hydroxy groups be dehydrated to form an epoxy linkage. It is possible to use, in addition to the bifunctional halohydrins, the polyfunctional halohydrins as well.

By the use of the term "difunctional halohydrin" we include the epihalohydrins and the dihalohydrins. Amongst the epihalohydrins which can be utilized with the polyamines to form the reaction products for use in the practice of this process, we include epichlorohydrin, epibromohydrin, epiiodohydrin, and the like. Amongst the difunctional dihalohydrins alkylene halohydrins which can be used with the polyalkylene polyamines to form the reaction products to be utilized in the practice of the process of this invention, we include such compounds as dichlorohydrin, dibromohydrin, and diiodohydrin, and the like.

It has been previously stated that, from an economic standpoint, it is advisable to use these resins in solution in percentages varying between 0.1% and 3.0%, based on the total weight of solution, but that concentration above 3.0% may be used; namely, concentrations up to 10% or even higher. But it must be remembered that in the use of these high solids resin solutions, the tendency toward gelation is much greater.

Reference is herein made to our copending application which has the Serial No. 101,916, filed on June 28, 1949. In that application, we have shown the use of ammonia halohydrin resins in aqueous dispersions for treating non-fibrous regenerated cellulosic film for the purpose of improving the bonding of the subsequently-applied topcoats to said cellulose film.

In the practice of the process of this invention, the regenerated cellulose film is dried after the immersion in the resin polyhydric alcohol softening bath. This drying step results in the partial curing of the affixed resin, so that when the topcoat is subsequently applied, it is so firmly anchored to the base that it does not readily slough off even after prolonged immersion in water.

We have discovered that thermosetting resins, such as alkylene polyamine, or polyalkylene polyamine bifunctional halohydrin cationic resins produce most satisfactory anchoring agents.

In the preparation of the resins used in the treatment of the non-fibrous cellulosic films by the processes of this invention, the polyamines may be reacted with the bifunctional halohydrins in near equimolar proportions, such as 1:1.1 respectively. Generally, however, these resins are formed by using such mol ratios of the polyamine and the halohydrin, so that an amount slightly less than the maximum of the reactive amino hydrogens are reacted with the halohydrin. For example, one mol of the tetraethylene pentamine, having 7 potential reactive hydrogens or a functionality of 7, in reacting with epichlorohydrin with a functionality of 2 would require 3.5 mols of the latter to 1 mol of the former, to realize the theoretically most complete reaction. The preferred mol ratio for these two compounds would be about 3 mols of the epichlorohydrin to 1 mol of the tetraethylene pentamine.

In actual practice it may, in certain instances, be desirable to use these optimum proportions because frequently some additional amine may be required to neutralize the hydrochloric acid produced during the reaction, thus assuring that the reaction is carried through to a satisfactory degree of condensation. In some cases, it is satisfactory to employ some sodium hydroxide or some non-reactive amine such as triethanolamine, or any tertiary amine (water-soluble) to avoid the use of great excesses of the reactive amine.

When such proportions of the polyamines and the difunctional halohydrins are used that would lead to a substantially linear or thermoplastic types of polymers, we have found that the resulting resin is practically ineffective for anchorage purposes. For example, tetraethylene pentamine and epichlorohydrin reacted in equi-molecular amounts yield a resin that shows a minimum of cross-linking and a high degree of aqueous solubility of the cured resin. This resin showed little or no capacity to anchor the lacquered topcoat to the cellulose base. As the amount of the difunctional halohydrin is increased, leading to a more completely cross-linked structure, the more effective are the resins produced.

In general, it may be said the difunctional halohydrin can be reacted with the polyamine in such proportions that one mole of the halohydrin is used for each two reactive amino hydrogens in the polyamine used per mol of that polyamine. This represents the maximum optimum theoretical proportions. Furthermore, the difunctional halohydrin can be reacted with polyamine in such proportions that 1.1 mol of the halohydrin is used per mol of polyamine. This represents the minimum theoretical proportion. However, in actual practice, proportions of about 1.2 mols of the halohydrins per mol of the polyamine to .48 mol of the halohydrin for each reactive hydrogen in the polyamine, per mol of said polyamine will be found to be preferable for most applications.

Example 6

Ninety-three (93) parts of water are added to 38 parts of tetraethylene pentamine with stirring throughout the addition. Fifty-five (55) parts of epichlorohydrin are added dropwise over a period of 1¾ hours. This represents a mol ratio of 1:3 of polyamine to halohydrin. The temperature of the mixture is regulated, so that a reaction temperature of between 45°–55° C. is maintained. This temperature control is continued until an increase in viscosity takes place, but before the resin reaches a gelled state. The resin is then diluted to 15% solids content by the addition of water. At this concentration, the resin is comparatively stable and can be further diluted as desired.

Example 7

Twenty-five (25) parts of water are added to 47 parts of tetraethylene pentamine and the mix is cooled to about 3° C. Eighty (80) parts of glycerol-alpha-dichlorohydrin is added dropwise over a period of two hours and the mixture is then allowed to warm up to room temperature over the next hour. This represents a mol ratio of about 1:2.9 of polyamine to halohydrin. The mix is then heated over a steam bath gradually to 92° C. for ½ hour. The resinous mixture is then chilled to about 6° C. Twelve (12) parts of a 97% sodium hydroxide solution in water and 36 parts of water are added to the resinous mixture which is kept chilled on a cooling bath for an additional ½ hour. The cooling bath is then removed. The resin is then diluted to about 15% solids by the addition of water. This resin solution is now comparatively stable and can be further diluted as desired.

Example 8

Three hundred (300) parts of water are added to 75 parts of triethylene tetramine with rapid stirring throughout the addition. One hundred and seventy (170) parts of epibromohydrin are added dropwise over a period of 4 hours. The temperature of the mixture is so regulated that a reaction temperature between 40°–60° C. is maintained. This temperature control is continued until the viscosity increases but the reaction mixture is allowed to cool to room temperature before the resin reaches a state of gelation. The resin is then diluted to about 15% solids content by the addition of water. Mol ratio of the resin is 1:25 polyamine to halohydrin respectively.

Example 9

Thirty (30) parts of water are added to 52 parts of diethylene triamine and the mixture is cooled to about 3°–5° C. Two hundred and eighteen (218) parts of dibromohydrin are added dropwise over a period of 5 hours and the mixture is allowed to warm up to room temperature over the next hour. The mixture is then heated over a steam bath gradually to 90°–95° C. for ½ hour. The resinous mixture is then chilled to about 5° C. Twenty-one (21) parts of a 97% sodium hydroxide solution in water and 60 parts of water are added to the resinous mixture which is kept chilled on a cooling bath for an additional ½ hour. The cooling bath is then removed. The resin is then diluted to about 15% solids by the addition of water. This resin solution is now comparatively stable and can be further diluted as desired. The mol ratio of this resin is 1.0 : 2.0 polyamine to halohydrin respectively.

In the practice of the process of this invention, it is desirable to control the pH of the aqueous resin solution between 6 and 9, with a pH value of between 7 and 8 preferred. An acidic condition in the aqueous resin dispersion produces a deleterious effect on the cellulose, if the acid is not subsequently neutralized. For this reason, it is usually desired that the application of the resin to the cellulose film be accomplished under neutral or weakly alkaline conditions. The adaptability of these resins to such application is one of the features of this process.

We claim:

1. A process for treating non-fibrous cellulosic film to improve the anchoring of said film to a subsequently-applied topcoat, which comprises the steps of immersing said cellulosic film in an aqueous dispersion of an aliphatic polyamine-difunctional halohydrin thermosetting cationic resin, removing the film, drying the film, thereby partially curing the affixed resin, and applying thereto a water-repellent coating composition.

2. A process for treating a non-fibrous cellulosic film to improve the anchoring of said film to a subsequently-applied topcoat, which comprises the steps of immersing said cellulosic film in an aqueous dispersion of an aliphatic polyamine-difunctional halohydrin thermosetting cationic resin, then immersing the film in a plasticizing bath, removing and drying the film, thereby partially curing the affixed resin and applying thereto a water-repellent coating composition.

3. A process for treating non-fibrous cellulosic film to improve the anchoring of said film to a subsequently-applied topcoat, which comprises the steps of immersing said cellulosic film in an aqueous dispersion of an aliphatic polyamine-difunctional halohydrin thermosetting cationic resin containing a plasticizing agent, removing the film, drying the film, thereby partially curing the affixed resin, and applying thereto a water-repellent coating composition.

4. A process for treating non-fibrous cellulosic film to improve the anchoring of said film to a subsequently-applied topcoat, which comprises the steps of immersing said cellulosic film in an aqueous dispersion of an alkylene polyamine-difunctional halohydrin thermosetting cationic resin containing a plasticizing agent, removing the film, drying the film, thereby partially curing the affixed resin, and applying thereto a water-repellent coating composition.

5. A process for treating non-fibrous cellulosic film to improve the anchoring of said film to a subsequently-applied topcoat, which comprises the steps of immersing said cellulosic film in an aqueous dispersion of polyalkylene polyamine-difunctional halohydrin thermosetting cationic resin containing a plasticizing agent, removing the film, drying the film, thereby partially curing the affixed resin, and applying thereto a water-repellent coating composition.

6. A process for treating non-fibrous cellulosic film to improve the anchoring of said film to a subsequently-applied topcoat, which comprises the steps of immersing said cellulosic film in an aqueous dispersion of a thermosetting ethylene diamine epichlorohydrin resin containing a plasticizing agent, removing the film, drying the film, thereby partially curing the affixed resin, and applying thereto a water-repellent coating composition.

7. A process for treating non-fibrous cellulosic film to improve the anchoring of said film to a subsequently-applied topcoat, which comprises the steps of immersing said cellulosic film in an aqueous dispersion of a thermosetting 1,3-diamino propane glycerol alpha dichlorohydrin resin containing a plasticizing agent, removing the film, drying the film, thereby partially curing the affixed resin, and applying thereto a water-repellent coating composition.

8. A process for treating non-fibrous cellulosic film to improve the anchoring of said film to a subsequently-applied topcoat, which comprises the steps of immersing said cellulosic film in an aqueous dispersion of a thermosetting 1,4-diamino-n-butane-epibromohydrin resin containing a plasticizing agent, removing the film, drying the film, thereby partially curing the affixed resin, and applying thereto a water-repellent coating composition.

9. A process for treating non-fibrous cellulosic film to improve the anchoring of said film to a subsequently-applied topcoat, which comprises the steps of immersing said cellulosic film in an aqueous dispersion of a thermosetting tetraethylene pentamine epichlorohydrin resin containing a plasticizing agent, removing the film, drying the film, thereby partially curing the affixed resin, and applying thereto a water-repellent coating composition.

10. A process for treating non-fibrous cellulosic film to improve the anchoring of said film to a subsequently-applied topcoat, which comprises the steps of immersing said cellulosic film in an aqueous dispersion of a thermosetting triethylene tetramine dichlorohydrin resin containing a plasticizing agent, removing the film, drying the film, thereby partially curing the affixed resin, and applying thereto a water-repellent coating composition.

11. A process for treating non-fibrous cellulosic film to improve the anchoring of said film to a subsequently-applied topcoat, which comprises the steps of immersing said cellulosic film in an aqueous dispersion of a thermosetting diethylene triamine epibromohydrin resin containing a plasticizing agent, removing the film, drying the film, thereby partially curing the affixed resin, and applying thereto a water-repellent coating composition.

12. A process for treating non-fibrous cellulosic film to improve the anchoring of said film to a subsequently-applied topcoat, which comprises the steps of immersing said cellulosic film in an aqueous dispersion of an aliphatic polyamine difunctional halohydrin thermosetting cationic resin, incorporating a plasticizing agent into the film, removing the film, drying the film, thereby partially curing the affixed resin, and applying thereto a water-repellent coating composition.

13. The process according to claim 9, in which the tetraethylene pentamine epichlorohydrin resin is present in an amount varying between 0.1% and 3.0% of the total weight of the aqueous dispersion.

14. The process as set forth in claim 10, in which the triethylene tetramine dichlorohydrin resin is present in an amount varying between 0.1% and 3.0%, based on the total weight of the aqueous dispersion.

15. The process according to claim 11, in which the diethylene triamine epibromohydrin resin is present in an amount varying between 0.1% and 3.0%, based on the total weight of the aqueous dispersion.

16. A non-fibrous cellulosic film impregnated with an aliphatic polyamine difunctional halohydrin thermosetting cationic resin and having a water-repellent coating composition bonded thereon wherein said resin is partially cured.

17. A non-fibrous cellulosic film impregnated with a thermosetting tetraethylene pentamine epichlorohydrin resin and having a water-repellent coating composition bonded thereon wherein said resin is partially cured.

18. A non-fibrous cellulosic film impregnated with a thermosetting triethylene tetramine-dichlorohydrin resin and having a water-repellent coating composition bonded thereon wherein said resin is partially cured.

19. A non-fibrous cellulosic film impregnated with a thermosetting diethylene triamine-epibromohydrin resin and having a water-repellent coating composition bonded thereon wherein said resin is partially cured.

JOHN HAROLD DANIEL, Jr.
CHESTER GREY LANDES.
JOHN DAVIS POLLARD.

REFERENCES CITED

The following references are of record in the file of this patent:

UNITED STATES PATENTS

| Number | Name | Date |
| --- | --- | --- |
| 2,104,092 | Munz et al. | Jan. 4, 1938 |
| 2,280,829 | Jebens | Apr. 28, 1942 |
| 2,320,225 | Ericks | May 25, 1943 |
| 2,394,009 | Pollard | Feb. 5, 1946 |
| 2,427,242 | Vitalis et al. | Sept. 9, 1947 |
| 2,469,683 | Dudley et al. | May 10, 1949 |
| 2,469,693 | Lundberg | May 10, 1949 |
| 2,479,480 | Dudley et al. | Aug. 16, 1949 |

OTHER REFERENCES

Ser. No. 393,282, Hopff (A. P. C.), published April 20, 1943.